United States Patent
Koyyalummal et al.

(10) Patent No.: US 11,443,205 B2
(45) Date of Patent: Sep. 13, 2022

(54) SELF-MANAGING DATABASE SYSTEM USING MACHINE LEARNING

(71) Applicant: salesforce.com, inc., San Francisco, CA (US)

(72) Inventors: Sudheendran Koyyalummal, San Ramon, CA (US); Asharam Yadav, Singapore (SG); Sai Prasad Mysary, Hyderabad (IN); Mahesh Kumar Bolagum, Singapore (SG); Esha Sharma, Herndon, VA (US)

(73) Assignee: Salesforce.com, Inc., San Francisco, CA (US)

( * ) Notice: Subject to any disclaimer, the term of this patent is extended or adjusted under 35 U.S.C. 154(b) by 454 days.

(21) Appl. No.: 16/713,348

(22) Filed: Dec. 13, 2019

(65) Prior Publication Data

US 2021/0182699 A1     Jun. 17, 2021

(51) Int. Cl.
*G06N 5/04*     (2006.01)
*G06F 16/27*     (2019.01)
*G06N 7/00*     (2006.01)

(52) U.S. Cl.
CPC ............ *G06N 5/04* (2013.01); *G06F 16/27* (2019.01); *G06N 7/005* (2013.01)

(58) Field of Classification Search
CPC .......... G06N 5/04; G06N 7/005; G06F 16/27
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |

(Continued)

*Primary Examiner* — Henry Tsai
*Assistant Examiner* — John B Roche
(74) *Attorney, Agent, or Firm* — Kwan & Olynick LLP

(57) ABSTRACT

A self-managing database system includes a metrics collector to collect metrics data from one or more databases of a computing system and an anomaly detector to analyze the metrics data and detect one or more anomalies. The system includes a causal inference engine to mark one or more nodes in a knowledge representation corresponding to the metrics data for the one or more anomalies and to determine a root cause with a highest probability of causing the one or more anomalies using the knowledge representation. The system includes a self-healing engine, to take at least one remedial action for the one or more databases in response to determination of the root cause.

28 Claims, 12 Drawing Sheets

(56) References Cited

U.S. PATENT DOCUMENTS

| | | |
|---|---|---|
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2017/0104658 A1* | 4/2017 | Sykes .................. H04L 41/044 |
| 2017/0200088 A1* | 7/2017 | Yang .................... H04W 24/04 |
| 2020/0084087 A1* | 3/2020 | Sharma ................ H04W 24/04 |

* cited by examiner

SELF-MANAGING DATABASE SYSTEM USING MACHINE LEARNING

TECHNICAL FIELD

One or more implementations relate to management of database processing, and more specifically to self-managing databases in a distributed system of a cloud computing environment.

BACKGROUND

"Cloud computing" services provide shared resources, software, and information to computers and other devices upon request or on demand. Cloud computing typically involves the over-the-Internet provision of dynamically scalable and often virtualized resources by a cloud service provider (CSP). Technological details can be abstracted from end-users, who no longer have need for expertise in, or control over, the technology infrastructure "in the cloud" that supports them. In cloud computing environments, software applications can be accessible over the Internet rather than installed locally on personal or in-house computer systems. Some of the applications or on-demand services provided to end-users can include the ability for a user to create, view, modify, store and share documents and other files.

Cloud computing systems are becoming increasingly more complex and system availability has become one of the most important requirements for users. A system failure often no longer impacts a single user or a small set of users, but instead the impact may be widespread and global. Significant downtime directly impacts the trust of users and partners as well as the reputation of the CSP. The failure of a hardware or software component in a cloud computing environment is inevitable, leading to a service incident. Responding to a typical incident in a large-scale, worldwide cloud computing environment may require the efforts of many people, such as system administrators, database experts, software engineers, hardware engineers, and project managers to identify and rectify a root cause of the incident.

BRIEF DESCRIPTION OF THE DRAWINGS

The included drawings are for illustrative purposes and serve to provide examples of possible structures and operations for the disclosed inventive systems, apparatus, methods, and computer-readable storage media. These drawings in no way limit any changes in form and detail that may be made by one skilled in the art without departing from the spirit and scope of the disclosed implementations.

DETAILED DESCRIPTION

A CSP securely stores and manages customer/user data using a database infrastructure. Availability of the database infrastructure is considered by many CSPs to be key to business success. A typical database (DB) infrastructure includes many software and hardware components such as relational databases, database servers, storage area networks (SANs), internal networks, etc. In some cloud computing environments, there are hundreds of these DB infrastructure units (also called pods) running at sites worldwide. In some cases, there are thousands of metrics/key performance indicators (KPIs) which are continually gathered from DB infrastructure components. The metrics/KPIs indicate the health of the system. At this scale, it's impossible for a DB infrastructure engineer to process all these metrics in real time, identify the root cause of a problem and quickly resolve the problem. The inability to quickly respond to and fix problems affects the availability of the DB infrastructure.

In response, embodiments of the present invention apply an anomaly detection process along with a Bayesian network as a knowledge representation to enable automatic analysis of relationships between metrics across multiple layers, in real time to determine the root cause of a problem and apply self-healing remediation actions.

Figure 1A:
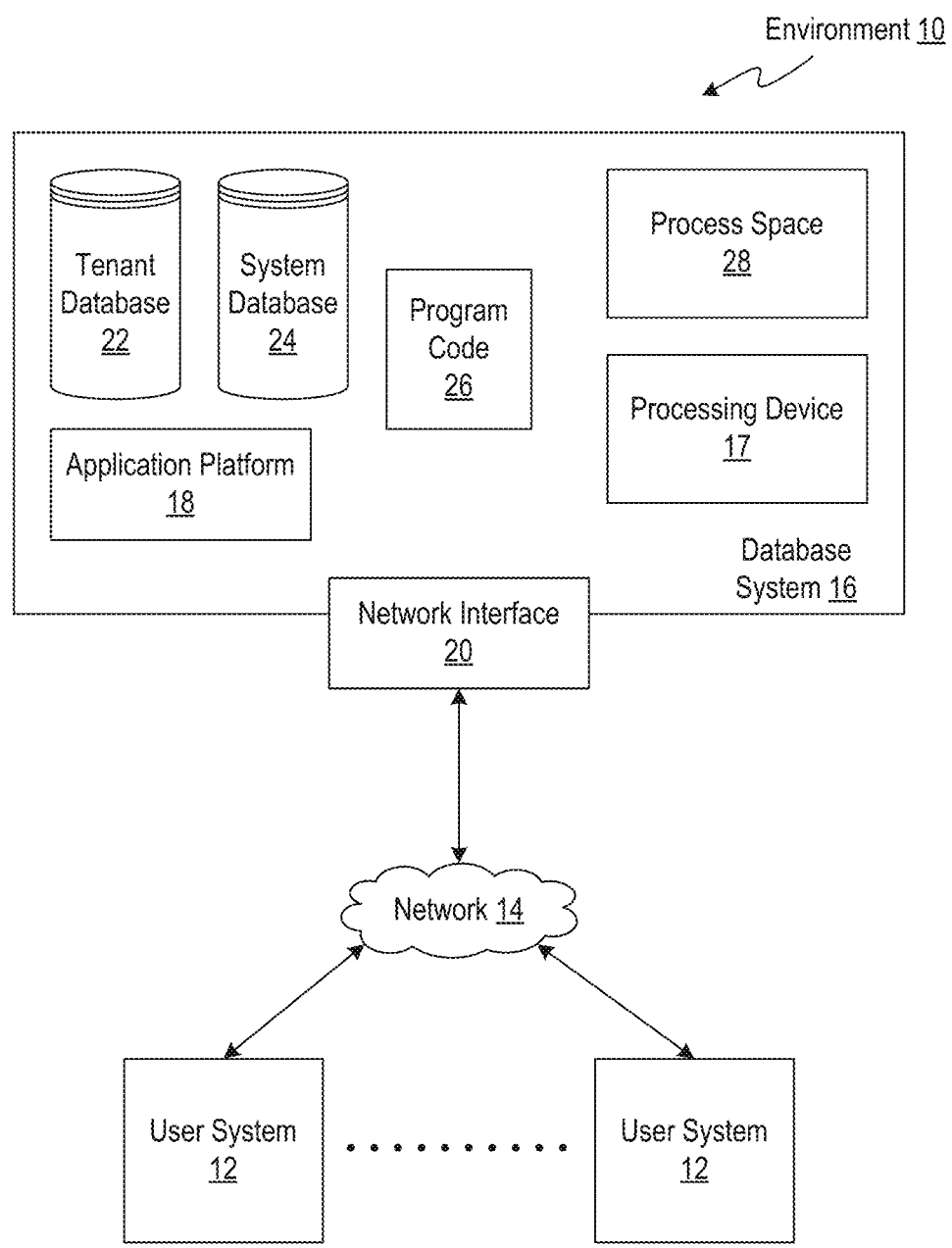
FIG. 1A illustrates an example computing environment of an on-demand database service according to some embodiments.

FIG. 1A illustrates a block diagram of an example of a cloud computing environment 10 in which an on-demand database service can be used in accordance with some implementations. Environment 10 includes user systems 12 (e.g., customer's computing systems), a network 14, a database system 16 (also referred to herein as a "cloud-based system" or a "cloud computing system"), a processing device 17, an application platform 18, a network interface 20, a tenant database 22 for storing tenant data (such as data sets), a system database 24 for storing system data, program code 26 for implementing various functions of the database system 16 (including a visual data cleaning application), and process space 28 for executing database system processes and tenant-specific processes, such as running applications for customers as part of an application hosting service. In some other implementations, environment 10 may not have all these components or systems, or may have other components or systems instead of, or in addition to, those listed above. In some embodiments, tenant database 22 is a shared storage.

In some implementations, environment 10 is a computing environment in which an on-demand database service exists. An on-demand database service, such as that which can be implemented using database system 16, is a service that is made available to users outside an enterprise (or enterprises) that owns, maintains, or provides access to database system 16. As described above, such users generally do not need to be concerned with building or maintaining database system 16. Instead, resources provided by database system 16 may be available for such users' use when the users need services provided by database system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a large number of customers, and a given database table may store rows of data for a potentially much larger number of customers. A database image can include one or more database objects. A relational database management system (RDBMS) or the equivalent can execute storage and retrieval of information against the database object(s).

Application platform 18 can be a framework that allows the applications of database system 16 to execute, such as the hardware or software infrastructure of database system 16. In some implementations, application platform 18 enables the creation, management and execution of one or more applications developed by the provider of the on-demand database service, users accessing the on-demand database service via user systems 12, or third-party application developers accessing the on-demand database service via user systems 12.

In some implementations, database system 16 implements a web-based customer relationship management (CRM) system. For example, in some such implementations, database system 16 includes application servers configured to implement and execute CRM software applications as well as provide related data, code, forms, renderable web pages, and documents and other information to and from user systems 12 and to store to, and retrieve from, a database system related data, objects, and World Wide Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. Database system 16 also implements applications other than, or in addition to, a CRM application. For example, database system 16 can provide tenant access to multiple hosted (standard and custom) applications, including a CRM application. User (or third-party developer) applications, which may or may not include CRM, may be supported by application platform 18. Application platform 18 manages the creation and storage of the applications into one or more database objects and the execution of the applications in one or more virtual machines in the process space of database system 16.

According to some implementations, each database system 16 is configured to provide web pages, forms, applications, data, and media content to user (client) systems 12 to support the access by user systems 12 as tenants of database system 16. As such, database system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application, such as an object-oriented database management system (OODBMS) or a relational database management system (RDBMS), as is well known in the art. It should also be understood that "server system", "server", "server node", and "node" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

Network 14 can be or include any network or combination of networks of systems or devices that communicate with one another. For example, network 14 can be or include any one or any combination of a local area network (LAN), wide area network (WAN), telephone network, wireless network, cellular network, point-to-point network, star network, token ring network, hub network, or other appropriate configuration. Network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

User systems 12 (e.g., operated by customers) can communicate with database system 16 using TCP/IP and, at a higher network level, other common Internet protocols to communicate, such as the Hyper Text Transfer Protocol (HTTP), Hyper Text Transfer Protocol Secure (HTTPS), File Transfer Protocol (FTP), Apple File Service (AFS), Wireless Application Protocol (WAP), etc. In an example where HTTP is used, each user system 12 can include an HTTP client commonly referred to as a "web browser" or simply a "browser" for sending and receiving HTTP signals to and from an HTTP server of the database system 16. Such an HTTP server can be implemented as the sole network interface 20 between database system 16 and network 14, but other techniques can be used in addition to or instead of these techniques. In some implementations, network interface 20 between database system 16 and network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

User systems 12 can be implemented as any computing device(s) or other data processing apparatus or systems usable by users to access database system 16. For example, any of user systems 12 can be a desktop computer, a workstation, a laptop computer, a tablet computer, a handheld computing device, a mobile cellular phone (for example, a "smartphone"), or any other Wi-Fi-enabled device, WAP-enabled device, or other computing device capable of interfacing directly or indirectly to the Internet or other network. When discussed in the context of a user, the terms "user system," "user device," and "user computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, Google's Chrome browser, or a WAP-enabled browser in the case of a cellular phone, personal digital assistant (PDA), or other wireless device, allowing a user (for example, a subscriber of on-demand services provided by database system 16) of user system 12 to access, process, and view information, pages, and applications available to it from database system 16 over network 14.

Each user system 12 also typically includes one or more user input devices, such as a keyboard, a mouse, a trackball, a touch pad, a touch screen, a pen or stylus, or the like, for interacting with a graphical user interface (GUI) provided by the browser on a display (for example, a monitor screen, liquid crystal display (LCD), light-emitting diode (LED) display, etc.) of user system 12 in conjunction with pages, forms, applications, and other information provided by database system 16 or other systems or servers. For example, the user interface device can be used to access data and applications hosted database system 16, and to perform searches on stored data, or otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with database system 16, that user system can have the capacities allotted to the salesperson. However, while an administrator is using that user system 12 to interact with database system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU), such as a Core® processor commercially available from Intel Corporation or the like. Similarly, database system 16 (and additional instances of an MTS, where more than one is present) and all of its components can be operator-configurable using application(s) including computer code to run using processing device 17, which may be implemented to include a CPU, which may include an Intel Core® processor or the like, or multiple CPUs. Each CPU may have multiple processing cores.

Database system 16 includes non-transitory computer-readable storage media having instructions stored thereon that are executable by or used to program a server or other computing system (or collection of such servers or computing systems) to perform some of the implementation of processes described herein. For example, program code 26 can include instructions for operating and configuring database system 16 to intercommunicate and to process web pages, applications (including visual data cleaning applications), and other data and media content as described herein. In some implementations, program code 26 can be downloadable and stored on a hard disk, but the entire program code, or portions thereof, also can be stored in any other volatile or non-volatile memory medium or device as is well known, such as a read-only memory (ROM) or random-access memory (RAM), or provided on any media capable of storing program code, such as any type of rotating media including floppy disks, optical discs, digital video discs (DVDs), compact discs (CDs), micro-drives, magneto-optical discs, magnetic or optical cards, nanosystems (including molecular memory integrated circuits), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, virtual private network (VPN), local area network (LAN), etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known.

Figure 1B:
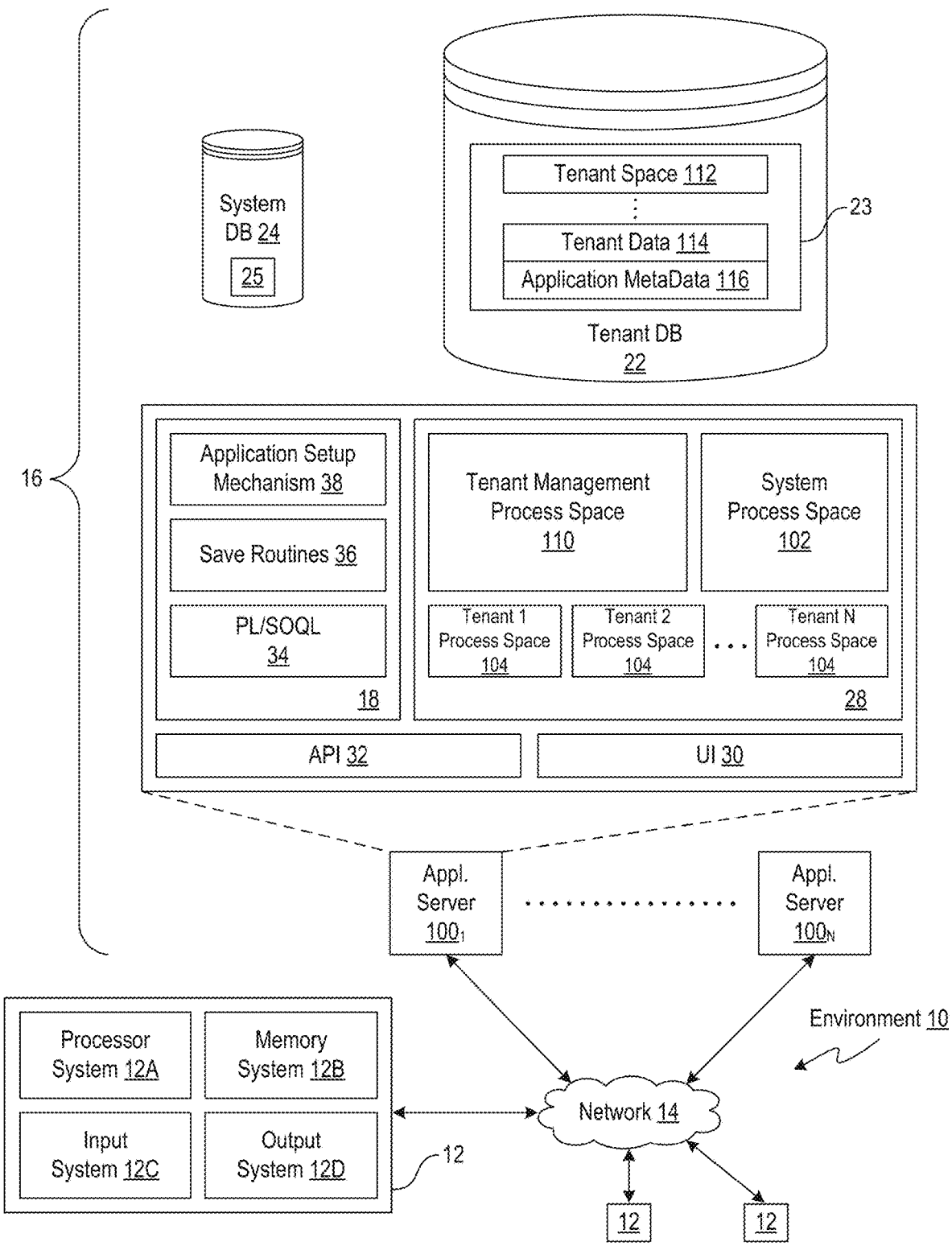
FIG. 1B illustrates example implementations of elements of FIG. 1A and example interconnections between these elements according to some embodiments.

FIG. 1B illustrates a block diagram of example implementations of elements of FIG. 1A and example interconnections between these elements according to some implementations. That is, FIG. 1B also illustrates environment 10, but in FIG. 1B, various elements of database system 16 and various interconnections between such elements are shown with more specificity according to some more specific implementations. In some implementations, database system 16 may not have the same elements as those described herein or may have other elements instead of, or in addition to, those described herein.

In FIG. 1B, user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, network interface 20 is implemented as a set of HTTP application servers $100_1$-$100_N$. Each application server 100, also referred to herein as an "app server," is configured to communicate with tenant database 22 and tenant data 23 stored therein, as well as system database 24 and system data 25 stored therein, to serve requests received from user systems 12. Tenant data 23 can be divided into individual tenant storage spaces 112, which can be physically or logically arranged or divided. Within each tenant storage space 112, tenant data 114 and application metadata 116 can similarly be allocated for each user. For example, a copy of a user's most recently used (MRU) items can be stored in tenant data 114. Similarly, a copy of MRU items for an entire organization that is a tenant can be stored to tenant space 112.

Database system 16 of FIG. 1B also includes a user interface (UI) 30 and an application programming interface (API) 32. Process space 28 includes system process space 102, individual tenant process spaces 104 and a tenant management process space 110. Application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process space 110, for example. Invocations to such applications can be coded using procedural language for structured query language (PL/SQL) 34, which provides a programming language style interface extension to the API 32. A detailed description of some PL/SQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, issued on Jun. 1, 2010, and hereby incorporated by reference herein in its entirety and for all purposes. Invocations to applications can be detected by one or more system processes, which manage retrieving application metadata 116 for the subscriber making the invocation and executing the metadata as an application in a virtual machine.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_2$ can be coupled via a direct network link, and another application server $100_N$ can be coupled by yet a different network connection. Transfer Control Protocol and Internet Protocol (TCP/IP) are examples of typical protocols that can be used for communicating between application servers 100 and database system 16. However, it will be apparent to one skilled in the art that other transport protocols can be used to optimize database system 16 depending on the network interconnections used.

In some implementations, each application server 100 is configured to handle requests for any user associated with any organization that is a tenant of database system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between application servers 100 and user systems 12 to distribute requests to application servers 100. In one implementation, the load balancer uses a least-connections algorithm to route user requests to application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, database system 16 can be a multi-tenant system in which database system 16 handles storage of, and access to, different objects, data, and applications across disparate users and organizations.

In one example storage use case, one tenant can be a company that employs a sales force where each salesperson uses database system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by database system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, database system 16 also can maintain system level data usable by multiple tenants or other data. Such system level data can include industry reports, news, postings, and the like that are sharable among tenants.

In some implementations, user systems 12 (which also can be client systems) communicate with application servers 100 to request and update system-level and tenant-level data from database system 16. Such requests and updates can involve sending one or more queries to tenant database 22 or system database 24. Database system 16 (for example, an application server 100 in database system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, issued on Aug. 17, 2010, and hereby incorporated by reference herein in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
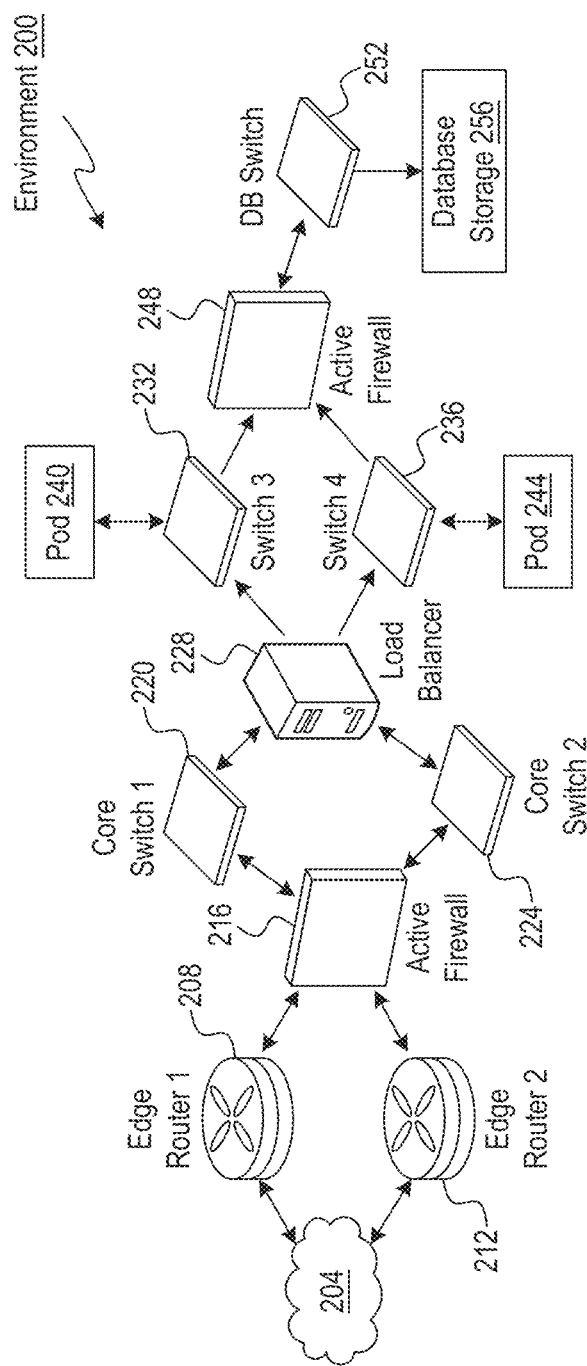
FIG. 2A illustrates example architectural components of an on-demand database service environment according to some embodiments.

FIG. 2A shows a system diagram illustrating example architectural components of an on-demand database service environment 200 according to some implementations. A client machine communicably connected with the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. Pods 240 and 244, which can each include one or more servers or other computing resources, can perform data processing and other operations used to provide on-demand services. Communication with the pods can be conducted via pod switches 232 and 236. Components of the on-demand database service environment can communicate with database storage 256 through a database firewall 248 and a database switch 252.

Figure 2B:
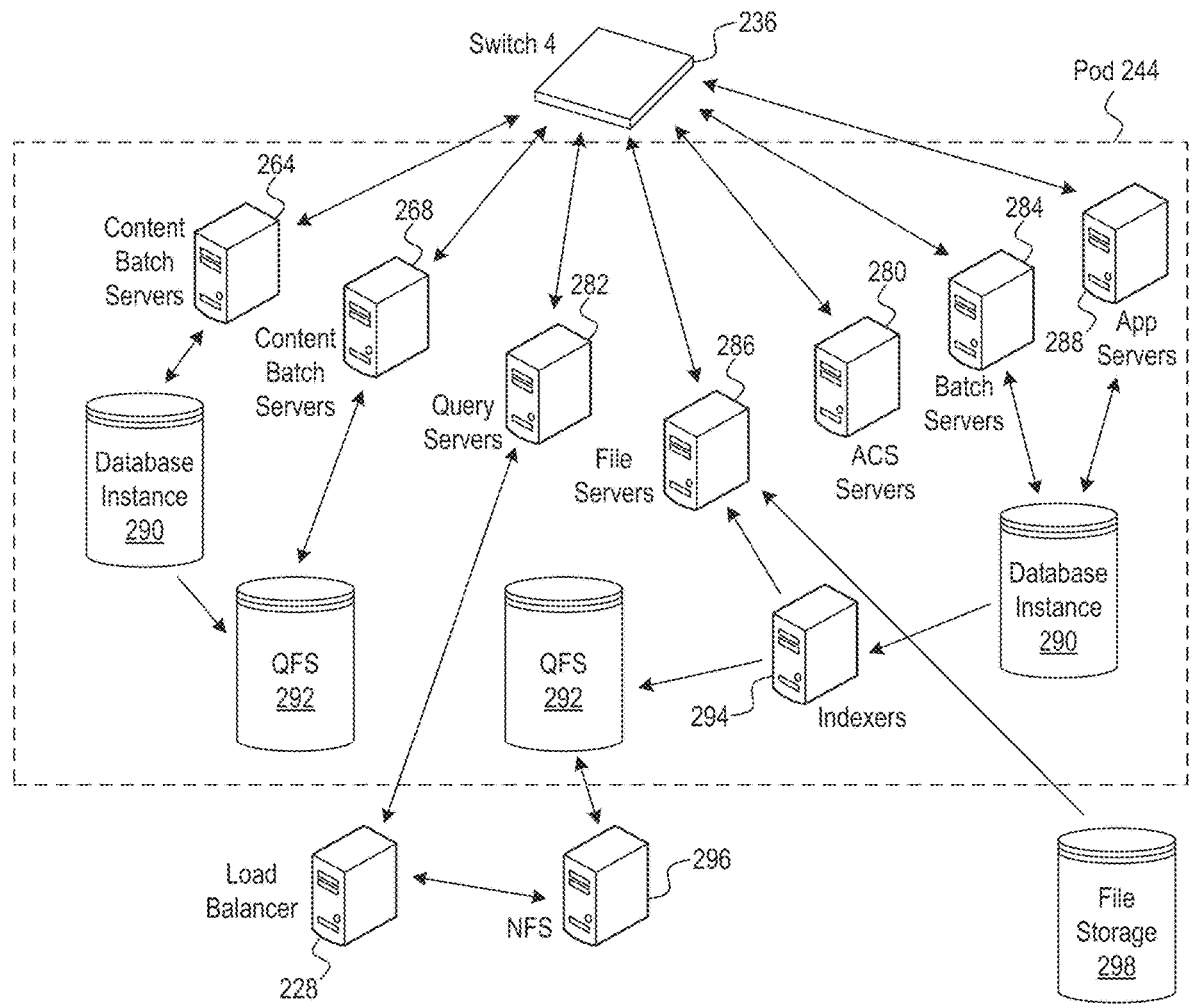
FIG. 2B illustrates example architectural components of an on-demand database service environment according to some embodiments.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to many devices of each type. Also, the on-demand database service environment need not include each device shown in FIGS. 2A and 2B or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server," "device," and "processing device" as used herein are not limited to a single hardware device; rather, references to these terms can include any suitable combination of hardware and software configured to provide the described functionality.

Cloud 204 is intended to refer to a data network or multiple data networks, often including the Internet. Client machines communicably connected with cloud 204 can communicate with other components of the on-demand database service environment 200 to access services provided by the on-demand database service environment. For example, client machines can access the on-demand database service environment to retrieve, store, edit, or process information. In some implementations, edge routers 208 and 212 route packets between cloud 204 and other components of the on-demand database service environment 200. For example, edge routers 208 and 212 can employ the Border Gateway Protocol (BGP). The BGP is the core routing protocol of the Internet. Edge routers 208 and 212 can maintain a table of Internet Protocol (IP) networks or 'prefixes,' which designate network reachability among autonomous systems on the Internet.

In some implementations, firewall 216 can protect the inner components of the on-demand database service environment 200 from Internet traffic. Firewall 216 can block, permit, or deny access to the inner components of on-demand database service environment 200 based upon a set of rules and other criteria. Firewall 216 can act as one or more of a packet filter, an application gateway, a stateful filter, a proxy server, or any other type of firewall.

In some implementations, core switches 220 and 224 are high-capacity switches that transfer packets within the on-demand database service environment 200. Core switches 220 and 224 can be configured as network bridges that quickly route data between different components within the on-demand database service environment. In some implementations, the use of two or more core switches 220 and 224 can provide redundancy or reduced latency.

In some implementations, pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between pods 240 and 244 is conducted via pod switches 232 and 236. Pod switches 232 and 236 can facilitate communication between pods 240 and 244 and client machines communicably connected with cloud 204, for example, via core switches 220 and 224. Also, pod switches 232 and 236 may facilitate communication between pods 240 and 244 and database storage 256. In some implementations, load balancer 228 can distribute workload between pods 240 and 244. Balancing the on-demand service requests between the pods can assist in improving the use of resources, increasing throughput, reducing response times, or reducing overhead. Load balancer 228 may include multilayer switches to analyze and forward traffic.

In some implementations, access to database storage 256 is guarded by a database firewall 248. Database firewall 248 can act as a computer application firewall operating at the database application layer of a protocol stack. Database firewall 248 can protect database storage 256 from application attacks such as SQL injection, database rootkits, and unauthorized information disclosure. In some implementations, database firewall 248 includes a host using one or more forms of reverse proxy services to proxy traffic before passing it to a gateway router. Database firewall 248 can inspect the contents of database traffic and block certain content or database requests. Database firewall 248 can work on the SQL application level atop the TCP/IP stack, managing applications' connection to the database or SQL management interfaces as well as intercepting and enforcing packets traveling to or from a database network or application interface.

In some implementations, communication with database storage 256 is conducted via database switch 252. Multi-tenant database storage 256 can include more than one hardware or software components for handling database queries. Accordingly, database switch 252 can direct database queries transmitted by other components of the on-demand database service environment (for example, pods 240 and 244) to the correct components within database storage 256. In some implementations, database storage 256 is an on-demand database system shared by many different organizations as described above with reference to FIGS. 1A and 1B.

FIG. 2B shows a system diagram further illustrating example architectural components of an on-demand database service environment according to some implementations. Pod 244 can be used to render services to a user of on-demand database service environment 200. In some implementations, each pod includes a variety of servers or other systems. Pod 244 includes one or more content batch servers 264, content search servers 268, query servers 282, file servers 286, access control system (ACS) servers 280, batch servers 284, and app servers 288. Pod 244 also can include database instances 290, quick file systems (QFS) 292, and indexers 294. In some implementations, some or all communication between the servers in pod 244 can be transmitted via pod switch 236.

In some implementations, app servers 288 include a hardware or software framework dedicated to the execution of procedures (for example, programs, routines, scripts) for supporting the construction of applications provided by on-demand database service environment 200 via pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods.

Content batch servers 264 can handle requests internal to the pod. Some such requests can be long-running or not tied to a particular customer. For example, content batch servers 264 can handle requests related to log mining, cleanup work, and maintenance tasks. Content search servers 268 can provide query and indexer functions. For example, the functions provided by content search servers 268 can allow users to search through content stored in the on-demand database service environment. File servers 286 can manage requests for information stored in file storage 298. File storage 298 can store information such as documents, images, and binary large objects (BLOBs). In some embodiments, file storage 298 is a shared storage. By managing requests for information using file servers 286, the image footprint on the database can be reduced. Query servers 282 can be used to retrieve information from one or more file systems. For example, query servers 282 can receive requests for information from app servers 288 and transmit information queries to network file systems (NFS) 296 located outside the pod.

Pod 244 can share a database instance 290 configured as a multi-tenant environment in which different organizations share access to the same database. Additionally, services rendered by pod 244 may call upon various hardware or software resources. In some implementations, ACS servers 280 control access to data, hardware resources, or software resources. In some implementations, batch servers 284 process batch jobs, which are used to run tasks at specified times. For example, batch servers 284 can transmit instructions to other servers, such as app servers 288, to trigger the batch jobs.

In some implementations, QFS 292 is an open source file system available from Sun Microsystems, Inc. The QFS can serve as a rapid-access file system for storing and accessing information available within the pod 244. QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in NFS 296 or other storage systems.

In some implementations, one or more query servers 282 communicate with the NFS 296 to retrieve or update information stored outside of the pod 244. NFS 296 can allow servers located in pod 244 to access information to access files over a network in a manner similar to how local storage is accessed. In some implementations, queries from query servers 282 are transmitted to NFS 296 via load balancer 228, which can distribute resource requests over various resources available in the on-demand database service environment. NFS 296 also can communicate with QFS 292 to update the information stored on NFS 296 or to provide information to QFS 292 for use by servers located within pod 244.

In some implementations, the pod includes one or more database instances 290. Database instance 290 can transmit information to QFS 292. When information is transmitted to the QFS, it can be available for use by servers within pod 244 without using an additional database call. In some implementations, database information is transmitted to indexer 294. Indexer 294 can provide an index of information available in database instance 290 or QFS 292. The index information can be provided to file servers 286 or QFS 292. In some embodiments, there may be a plurality of database instances stored and accessed throughout the system.

Figure 3:
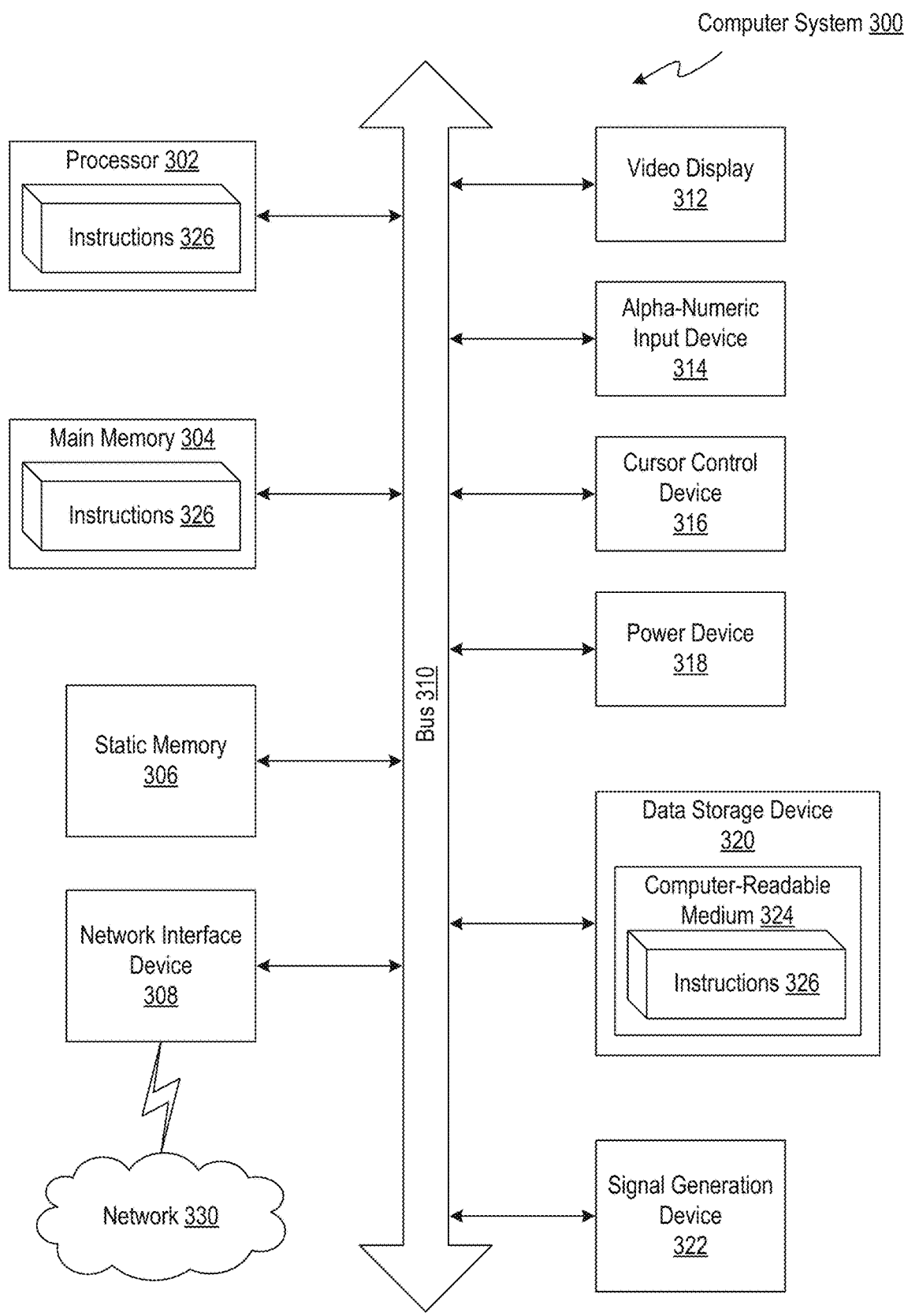
FIG. 3 is a diagrammatic representation of a machine in the exemplary form of a computer system within which one or more embodiments may be carried out.

FIG. 3 illustrates a diagrammatic representation of a machine in the exemplary form of a computer system 300 within which a set of instructions (e.g., for causing the machine to perform any one or more of the methodologies discussed herein) may be executed. In alternative implementations, the machine may be connected (e.g., networked) to other machines in a LAN, a WAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a PDA, a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 300 may be utilized by or illustrative of any of the electronic components described herein (e.g., any of the components illustrated in or described with respect to FIGS. 1A, 1B, 2A, and 2B).

The exemplary computer system 300 includes a processing device (processor) 302, a main memory 304 (e.g., ROM, flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a data storage device 320, which communicate with each other via a bus 310.

Processor 302 represents one or more general-purpose processing devices such as a microprocessor, central processing unit, or the like. More particularly, processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 302 may also be one or more special-purpose processing devices such as an application specific integrated circuit (ASIC), a field programmable gate array (FPGA), a digital signal processor (DSP), network processor, or the like. Processor 302 is configured to execute instructions 326 for performing the operations and steps discussed herein. Processor 302 may have one or more processing cores.

Computer system 300 may further include a network interface device 308. Computer system 300 also may include a video display unit 312 (e.g., a liquid crystal display (LCD), a cathode ray tube (CRT), or a touch screen), an alphanumeric input device 314 (e.g., a keyboard), a cursor control device 316 (e.g., a mouse or touch screen), and a signal generation device 322 (e.g., a loudspeaker).

Power device 318 may monitor a power level of a battery used to power computer system 300 or one or more of its components. Power device 318 may provide one or more interfaces to provide an indication of a power level, a time window remaining prior to shutdown of computer system 300 or one or more of its components, a power consumption rate, an indicator of whether computer system is utilizing an external power source or battery power, and other power related information. In some implementations, indications related to power device 318 may be accessible remotely (e.g., accessible to a remote back-up management module via a network connection). In some implementations, a battery utilized by power device 318 may be an uninterruptable power supply (UPS) local to or remote from computer system 300. In such implementations, power device 318 may provide information about a power level of the UPS.

Data storage device 320 may include a computer-readable storage medium 324 (e.g., a non-transitory computer-readable storage medium) on which is stored one or more sets of instructions 326 (e.g., software) embodying any one or more of the methodologies or functions described herein. Instructions 326 may also reside, completely or at least partially, within main memory 304 and/or within processor 302 during execution thereof by computer system 300, main memory 304, and processor 302 also constituting computer-readable storage media. Instructions 326 may further be transmitted or received over a network 330 (e.g., network 14) via network interface device 308.

In one implementation, instructions 326 include instructions for performing any of the implementations described herein. While computer-readable storage medium 324 is shown in an exemplary implementation to be a single medium, it is to be understood that computer-readable storage medium 324 may include a single medium or multiple media (e.g., a centralized or distributed database, and/or associated caches and servers) that store the one or more sets of instructions.

Figure 4:
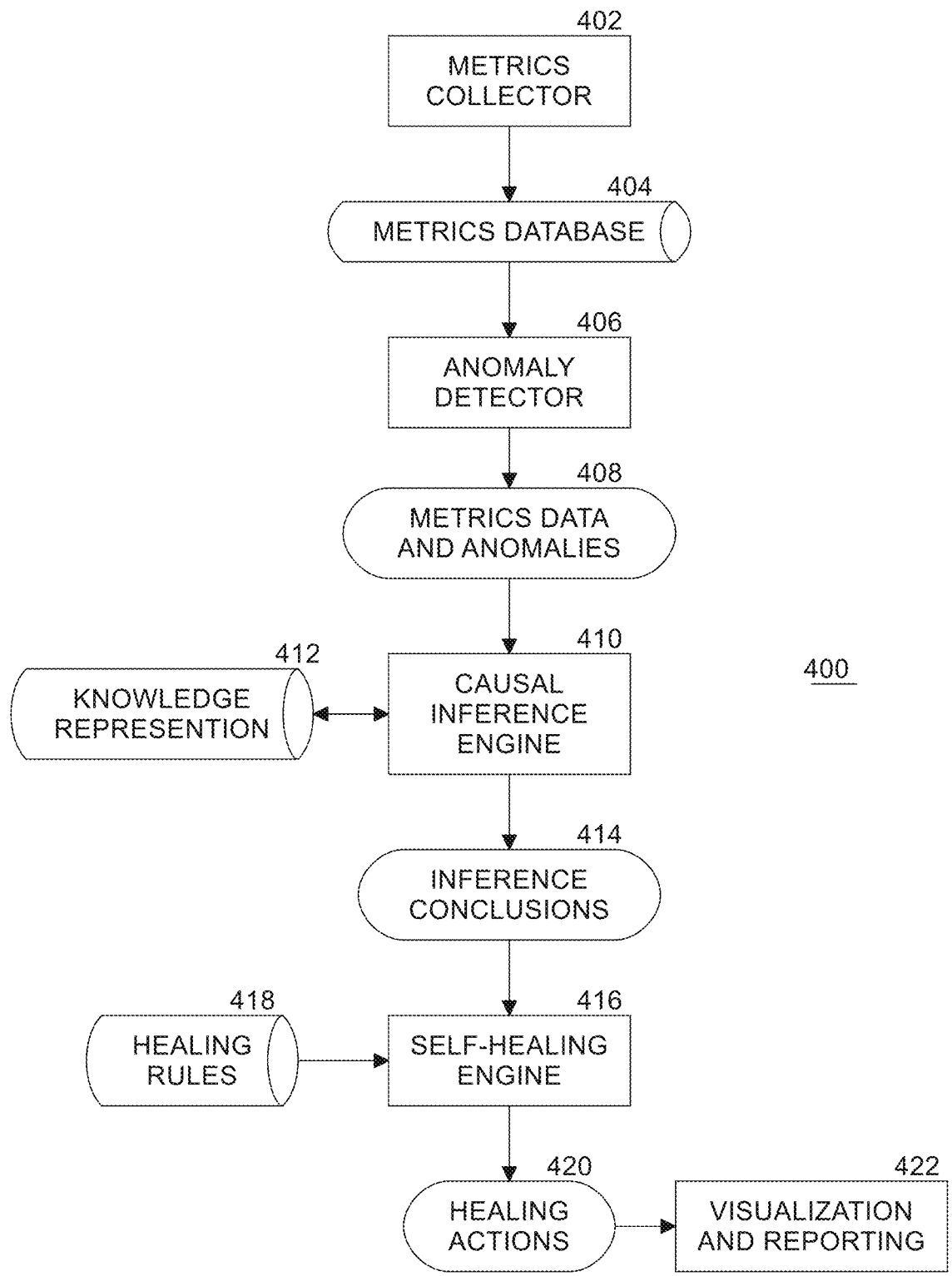
FIG. 4 is a diagram of a self-managing database system using machine learning according to some embodiments.

FIG. 4 is a diagram of a self-managing database system 400 using machine learning according to some embodiments. According to some embodiments, self-managing database system 400 is executed by one or more of database system 16 of FIG. 1, pod 240 or 244 of FIG. 2A, batch servers 284, database instance 290, or app servers 288 of FIG. 2B, and/or processor 302 of FIG. 3. In an embodiment, self-managing database system 400 is invoked in the cloud computing environment once every five minutes. In other embodiments, other frequencies are used.

Metrics collector 402 collects DB and/or operating system (OS) metrics, error codes, and system/DB change information (collectively called metrics data herein) from any one or more of the components described in FIGS. 1, 2, and 3. Metrics data are collected at any frequency, at predetermined times, or upon occurrence of an error. It is anticipated that in embodiments of the present invention the quantity and size of metric data received from system components worldwide in real time will be very large (e.g., thousands, tens of thousands, or even hundreds of thousands of metric data values per unit time, and tens, hundreds, or even thousands of gigabytes of data per unit time). In one embodiment, the unit of time is a minute, but the unit of time is configurable. Metrics collector 402 accepts the metrics data and stores metrics data in metrics database 404 for subsequent use by self-managing database system 400.

Figure 5:
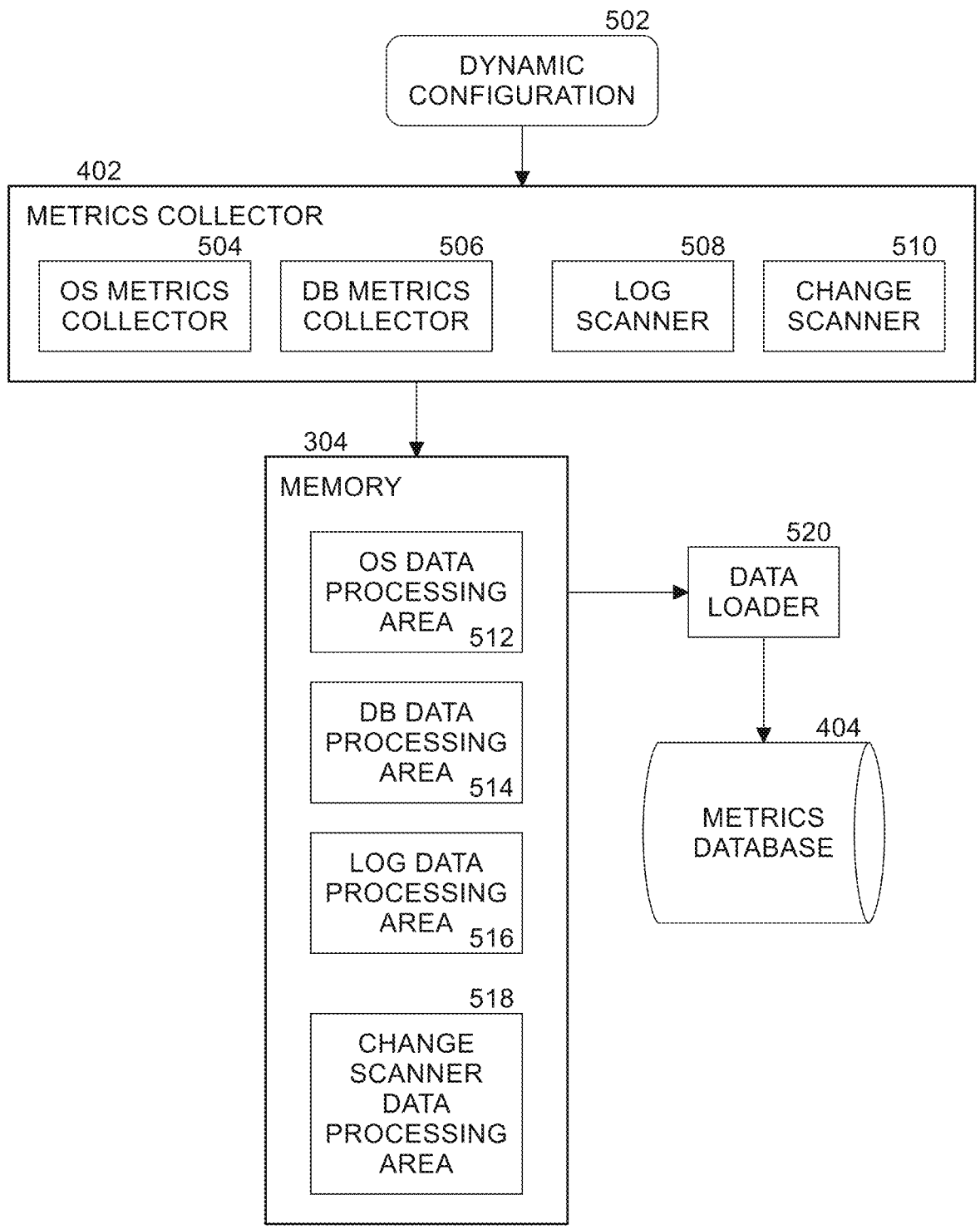
FIG. 5 is a diagram of metrics collection according to some embodiments.

FIG. 5 is a diagram of metrics data collection according to some embodiments. Dynamic configuration 502 comprises a data structure to define the metrics data that is to be collected and the frequency of collection. In an embodiment, dynamic configuration 502 is specified by a system administrator. In an embodiment, dynamic configuration 502 is a script written in a markup language. Metrics collector 402 reads dynamic configuration 502 to control operations of OS metrics collector 504, DB metrics collector 506, log scanner 508, and change scanner 510 of metrics collector 402. OS metrics collector 504 collects OS metrics data and stores the OS metrics data in OS data processing area 512 of memory 304. DB metrics collector 506 collects DB metrics data and stores the DB metrics data in DB data processing area 514 of memory 304. Log scanner 508 collects metrics data from log files and stores the log files metrics data in log data processing area 516 of memory 304. Change scanner 510 collects metrics data from changes made to DBs or other software components and stores the changes metrics data in change scanner data processing area 518 of memory 304.

Thus, metrics collector 402 stores metrics data in memory 304 for use in real time processing of recently obtained metrics data by self-managing database system 400. In one embodiment, the time period for this metrics data is the past two hours and is updated every minute. Thus, memory 304 always stores the latest two hours of metrics data. In other embodiments, other time periods may be used for recent metrics data (e.g., 30 minutes, one hour, four hours, a day, etc.) and the update schedule may be changed (e.g., every two minutes, every five minutes, every ten minutes, and so on). In one embodiment, metrics data is segregated in memory 304 into separate portions of memory as described above. Thus, for example, OS metrics data is stored in OS data processing area 512, DB metrics data is stored in DB data processing area 514, log metrics data is stored in log data processing area 516, and change scanner data is stored in change scanner data processing area 518. In other embodiments, the different types of metrics data may be co-mingled and stored in the same area of memory 304. In some embodiments, the different types of metrics data are tagged to identify the type of data. Data loader 520 stores metrics data in metrics database 404. In an embodiment, metrics database 404 is a part of system database 24 of FIG. 1 and/or data storage device 320 of FIG. 3. In an embodiment, metrics data includes historical metrics data and recent metrics data. In one embodiment, historical metrics data includes metrics data received longer than two hours ago, and recent metrics data includes metrics data received less than or equal to two hours ago. In other embodiments, other time thresholds may be used (e.g., 30 minutes, one hour, and so on). Thus, in some embodiments, the metrics collector 402 stores metrics data collected within a most recent selected period of time in memory 304 of the computing system (e.g., a random access memory (RAM) and metrics data collected earlier than the most recent selected period of time (e.g., historical metrics data) is stored in a long term storage device (e.g., hard drive, solid state drive, etc.) of the computing system by data loader 520. In one embodiment, data loader 520 copies metrics data from memory 304 into metrics database 404 on a periodic basis, such as every minute. In other embodiments, other time periods are used. This ensures that if the system crashes, the metrics data in memory is not lost.

Returning back to FIG. 4, metrics database 404 is input to anomaly detector 406. Anomaly detector 406 analyzes metrics data in metrics database 404 and/or memory 304 to generate metrics and anomalies 408.

In embodiment of the present invention, production DB infrastructure components are heterogeneous and training a model which can fit well for all DB components of the cloud computing environment is tedious and time intensive for system engineers. In response, an anomaly detection approach is used in embodiments to detect abnormal patterns in metrics database 404, then the results of anomaly detection analysis are passed to a Bayesian network (in one embodiment) for root cause analysis.

One known technique for identifying anomalies includes computation of an Extreme Student Deviate (ESD). In ESD, a "Z score" for an observed value is computed using the following formula:

$$ESD_{zscore} = \frac{x_k - \text{mean}(X)}{\sigma}$$

where $x_k$ is an observed metric data value, X is a distribution, and δ is the standard deviation. Since the ESD formula is based on mean ( ) and standard deviation, this ESD formula is highly sensitive to outlier values and is not suitable for managing databases in the cloud computing environment.

In embodiments of the present invention, a new anomaly detection formula for a Z score is used:

$$zscore(\text{of } x_r) = (x_r - \text{median}(X_h)) \div (\text{median}(|X_{h(i)}| - \text{median}(X_h)|_{i=1...n}))$$

where $x_r$ is a metrics data sample value from recent metrics data, $X_h$ are metrics data sample values of "h" hours (e.g., historical metrics data set values), and $X_{h(i) \text{where } i=1...n}$ are metrics data sample values in $X_h$.

Figure 6A:
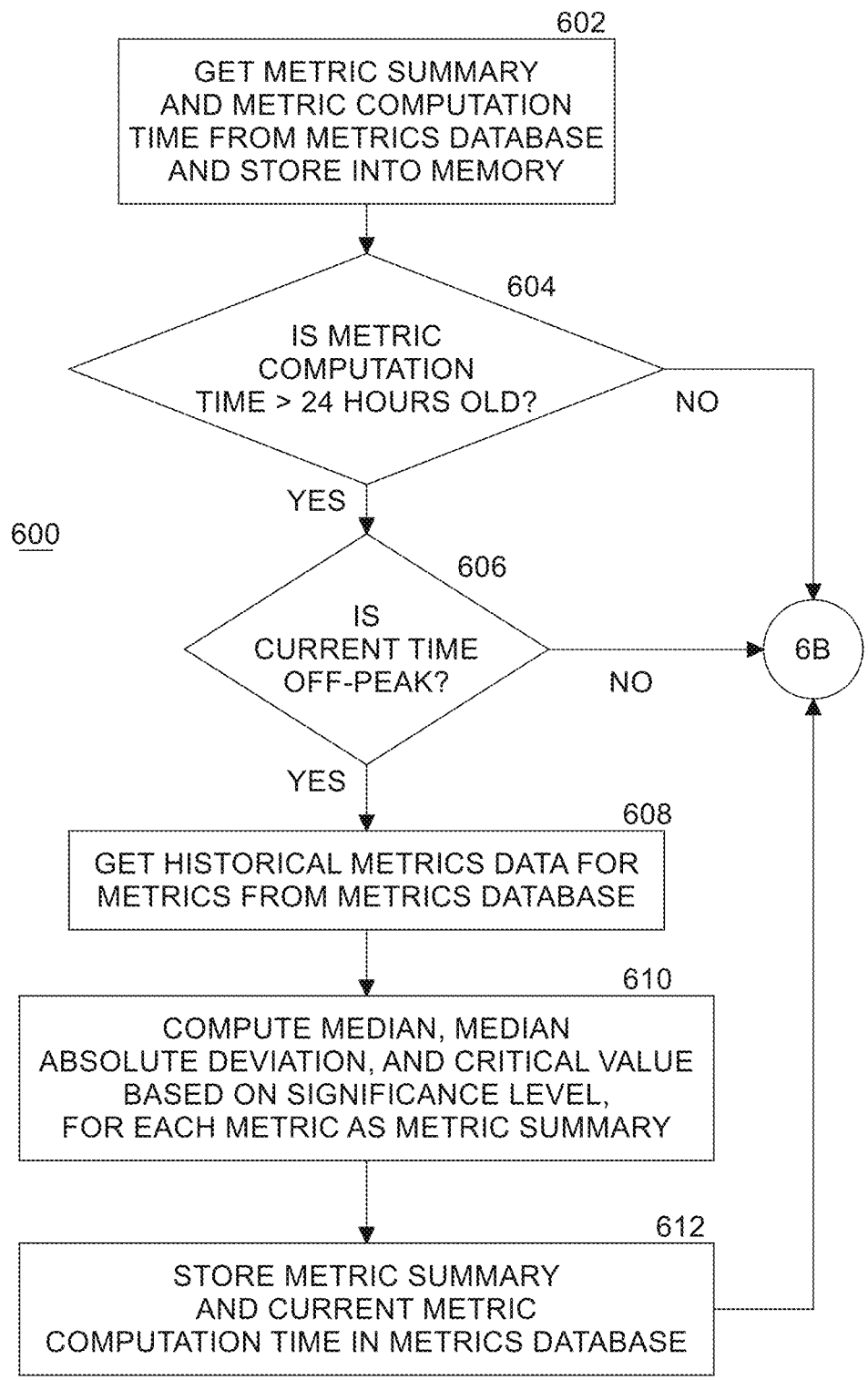
FIGS. 6A and 6B are flow diagrams of anomaly detector processing according to some embodiments.
Figure 6B:
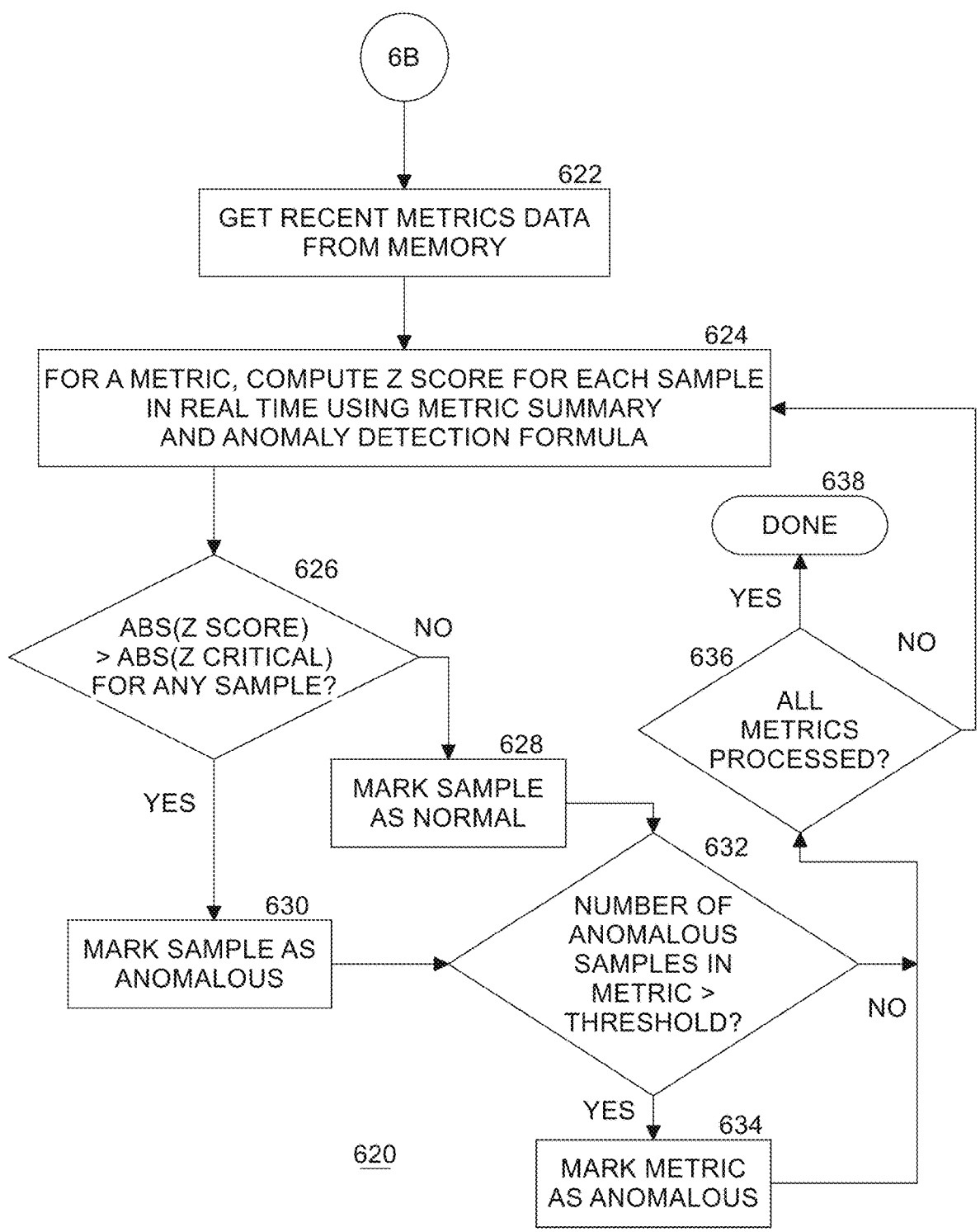

FIGS. 6A and 6B are flow diagrams 600, 620 of anomaly detector 406 processing according to some embodiments. In an embodiment, anomaly detector 406 is executed repeatedly while a cloud computing environment is operational at a frequency that is selectable. At block 602, anomaly detector 406 gets a previously computed metric summary and a last metrics computation time of the metric summary from metrics database 404 in data storage device 320 and loads this data into memory 304. In an embodiment, the metric summary includes the median, median absolute deviation (MAD) and critical threshold value for a metric as performed below at block 610. At block 604, in one embodiment, anomaly detector 406 determines if the last metrics computation time is more than 24 hours old (e.g., as compared to the current time). In other embodiments, other time periods may be used (e.g., two days, three days, 12 hours, 6 hours, and so on). In one embodiment, if 24 hours has not passed since the last metrics computation, then processing continues at block 6B on FIG. 6B. In one embodiment, if at least 24 hours has passed, then processing continues with block 606. At block 606, if anomaly detector 406 determines that the current time is not off-peak, then processing continues at block 6B of FIG. 6B. In one embodiment, off-peak times are outside of normal business hours for a geographic location, such as between 5 pm and 9 am. In other embodiments, other times for off-peak may be used. If the current time is off-peak, then at block 608 anomaly detector 406 gets historical metrics data for one or more metrics from metrics database 404. In an embodiment, the historical metrics data includes two months of metrics data from metrics database 404 for each metric. In other embodiment, other amounts of historical metrics data are obtained.

At block 610, anomaly detector 406 computes a metrics summary of a median, a MAD, and a critical threshold value based on a predetermined significance level (e.g., alpha=0.02) for each metric based at least in part on the historical metrics data. In an embodiment, these computations are performed during an off-peak time for the cloud computing environment, since these computations are typically computationally intensive. At block 612, anomaly detector 406 stores the metric summary and current metric computation time in metrics database 404.

Processing continues with block 622 of FIG. 6B, where anomaly detector 406 gets recent metrics data from memory 304. In an embodiment, the recent metrics data includes the last five minutes of metrics data for one or more metrics. In other embodiments, other time thresholds can be used. In an embodiment, one or more metrics are included in the recent metrics data and anomaly detector processing includes performing blocks 624 through 634 for each metric. In an embodiment, five data samples are taken for each metric represented in the recent metrics data. In other embodiment, other numbers of samples per metric may be used. At block 624, for a current metric the anomaly detector computes a Z score for each sample of the current metric in real time using the metric summary (read from metrics database 404) and the anomaly detection formula of embodiments of the present invention. The Z score represents an anomaly value for the sample.

At block 626, the Z score of each sample is compared against the current metric's critical threshold value (Z critical) to check if the current sample is an outlier or not.

$$\text{Test}(|zscore(\text{of } x_r)| > |Z_{critical@a}|)$$

At block 626, if the absolute value of the Z score for a sample is greater than the critical threshold then anomaly detector 406 at block 630 marks the sample as anomalous and saves this information. Otherwise, anomaly detector 406 at block 628 marks the sample as normal and saves this information. In one embodiment, anomaly detector may pre-set all samples of a metric as normal and only change the annotation of the sample if an anomaly is detected. At block 632, if the number of anomalous samples in the current metric is greater than a predetermined threshold, then the current metric is marked as anomalous at block 634 and this information is saved in an anomalous metric data structure in memory 304 (e.g., part of metrics data and anomalies 408). In an embodiment, the threshold may be three when the sample size is five (e.g., when three out of five samples are anomalous, then the current metric is considered to be anomalous). Other sample sizes and thresholds may be used in various embodiments. Processing continues at block 636, where anomaly detector determines if all metrics have been processed for the second set. If so, anomaly detector processing is done at block 638 when all samples of all metrics of the recent metrics data have been processed. Otherwise, anomaly detector processing continues with the next metric of the recent metrics data at block 624.

Figure 7:
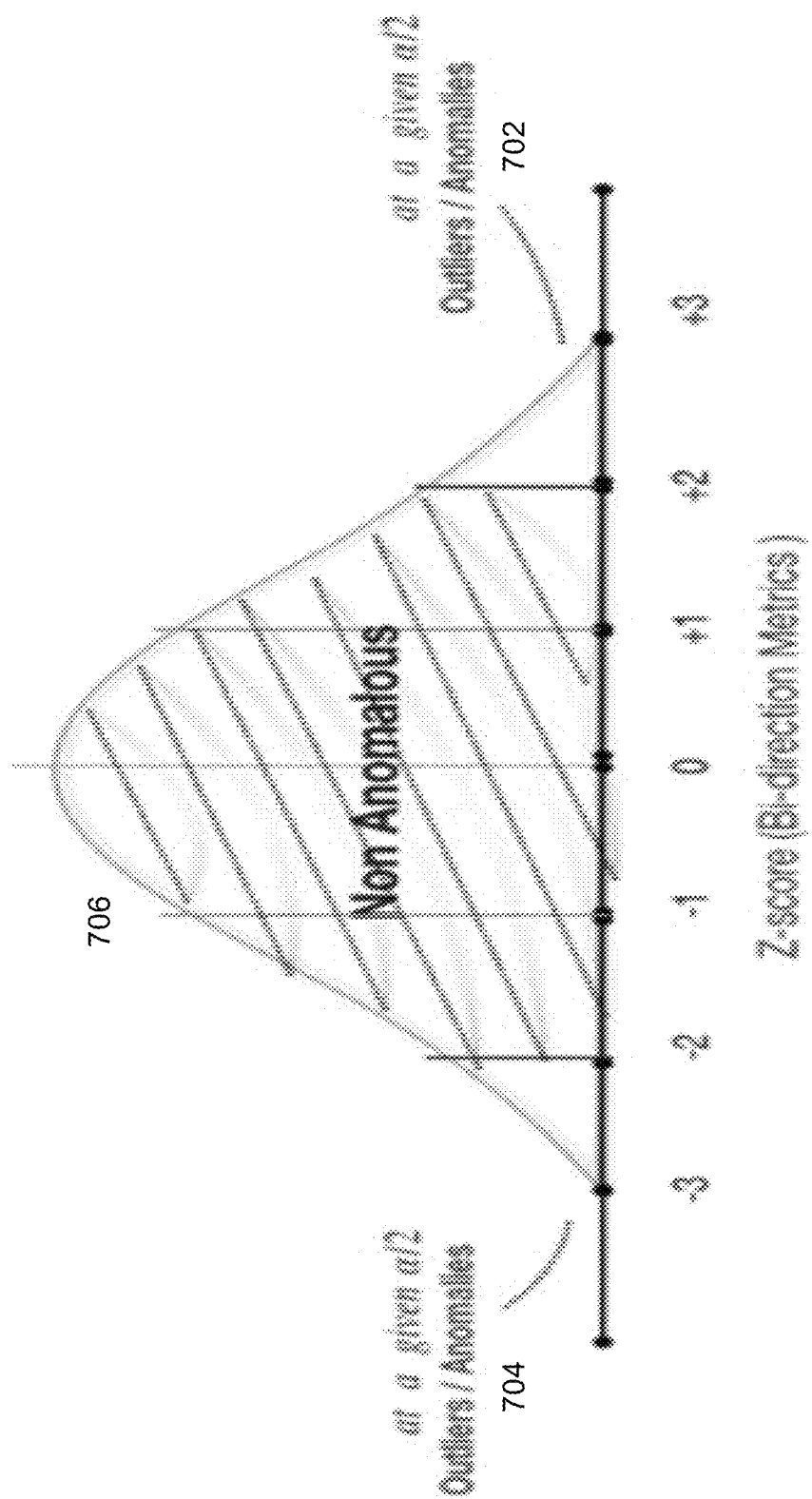
FIG. 7 is an example graph of a Z score distribution according to some embodiments.

FIG. 7 is an example graph of a Z score distribution according to some embodiments. In this example, a Z score greater than or equal to 2 is considered to be anomalous 702, and a Z score less than or equal to −2 is considered to be anomalous 704. A Z score between −2 and 2 is considered to be non-anomalous 706.

Returning to FIG. 4, metrics and anomalies 408 includes metrics data from metrics database 404 and anomalies identified by anomaly detector 406. Metrics and anomalies 408 information is input along with knowledge representation 412 to causal inference engine 410. In an embodiment, knowledge representation 412 is a Bayesian network. In other embodiments, other structures for knowledge representation may be used. Causal inference engine 410 determines a root cause of an issue highlighted by one or more anomalies detected by anomaly detector 406. Metrics and their relationships are modeled in knowledge representation 412. In an embodiment, the Bayesian network is populated a priori using subject matter expertise (e.g., from DB engineers, for example) and historical data insights. A conditional probability distribution table is generated for each node and evaluated using historical data insights.

Figure 8:
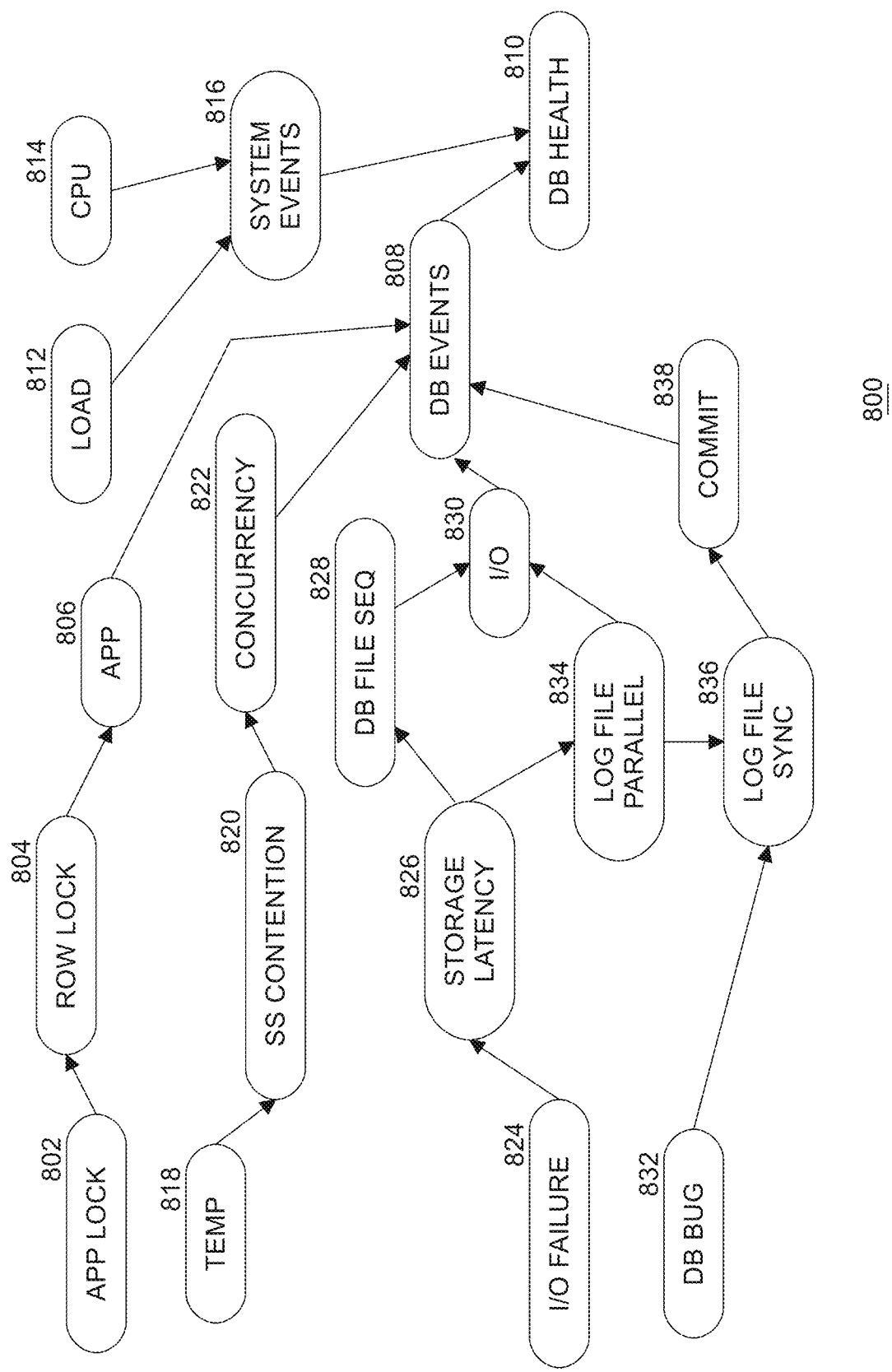
FIG. 8 is an example diagram of a knowledge representation according to some embodiments.

FIG. 8 is an example diagram of a knowledge representation 412 according to some embodiments. In the example, nodes in the Bayesian network 800 are built and populated for analyzing a database infrastructure (such as database system 16). In other examples, other Bayesian networks may be built and populated based on subject matter knowledge for a specific scenario. Each node of the Bayesian network includes a conditional probability distribution table as shown below. Each node represents an event such as a possible error condition in database system 16 and relationships with other nodes in the Bayesian network. By analyzing the Bayesian network, causal inference engine 410 determines a most likely root cause for an issue indicated by anomalies.

TABLE 1

App Lock (AL) 802

| APP LOCK (AL) | CPD |
|---|---|
| AL_0 | 0.7 |
| AL_1 | 0.3 |

TABLE 2

Row Lock (RL) 804

| P(RL|AL) AL | AL_0 | AL_1 |
|---|---|---|
| RL_0 | 0.9 | 0.2 |
| RL_1 | 0.1 | 0.8 |

TABLE 3

Application (APP) 806

| P(APP|RL) RL | RL_0 | RL_1 |
|---|---|---|
| APP_0 | 0.9 | 0.2 |
| APP_1 | 0.1 | 0.8 |

TABLE 4

Load 812

| Load | CPD |
|---|---|
| Load_0 | 0.7 |
| Load_1 | 0.2 |

TABLE 5

CPU 814

| CPU | CPD |
|---|---|
| CPU_0 | 0.7 |
| CPU_1 | 0.3 |

TABLE 6

System Events (SYS) 816

| P(SYS|Load, CPU) Load CPU | Load_0 CPU_0 | Load_1 CPU_1 | Load_0 CPU_0 | Load_1 CPU_1 |
|---|---|---|---|---|
| SYS_0 | 0.9 | 0.1 | 0.2 | 0.05 |
| SYS_1 | 0.1 | 0.9 | 0.8 | 0.95 |

TABLE 7

Temperature Issue (TI) 818

| TEMP ISSUE | CPD |
|---|---|
| TI_0 | 0.7 |
| TI_1 | 0.3 |

TABLE 8

SS Contention (SSC) 820

| P(SSC|TI) TI | TI_0 | TI_1 |
|---|---|---|
| SSC_0 | 0.9 | 0.2 |
| SSC_1 | 0.1 | 0.8 |

TABLE 9

Concurrency (CON) 822

| P(CON\|SSC) SSC | SSC_0 | SSC_1 |
|---|---|---|
| CON_0 | 0.9 | 0.2 |
| CON_1 | 0.1 | 0.8 |

TABLE 10

I/O Failure (IOF) 824

| IOF | CPD |
|---|---|
| IOF_0 | 0.4 |
| IOF_1 | 0.6 |

TABLE 11

Storage Latency (SL) 826

| P(SL\|OF) IOF | IOF_0 | IOF_1 |
|---|---|---|
| SL_0 | 0.9 | 0.1 |
| SL_1 | 0.1 | 0.9 |

TABLE 12

DB File Seq (DBFS) 828

| P(DBFS\|SL) SL | SL_0 | SL_1 |
|---|---|---|
| DBFS_0 | 0.9 | 0.2 |
| DBFS_1 | 0.1 | 0.8 |

TABLE 13

Log File Parallel (LFP) 834

| P(LFP\|SL) SL | SL_0 | SL_1 |
|---|---|---|
| LFP_0 | 0.9 | 0.2 |
| LFP_1 | 0.1 | 0.8 |

TABLE 14

I/O (IO) 830

| P(IO\|LFP, DBFS) LFP | LFP_0 | LFP_0 | LFP_1 | LFP_1 |
|---|---|---|---|---|
| DBFS | DBFS_0 | DBFS_1 | DBFS_0 | DBFS_1 |
| IO_0 | 0.9 | 0.1 | 0.2 | 0.05 |
| IO_1 | 0.1 | 0.9 | 0.8 | 0.95 |

TABLE 15

Multiple DB Bugs (DBG) 832

| DBG | CPD |
|---|---|
| DBG_0 | 0.8 |
| DBG_1 | 0.2 |

TABLE 16

Log File Sync (LFS) 836

| P(LFS\|, DBG, LFP) DBG | DBG_0 | DBG_0 | DBG_1 | DBG_1 |
|---|---|---|---|---|
| LFP | LFP_0 | LFP_1 | LFP_0 | LFP_1 |
| LFS_0 | 0.9 | 0.1 | 0.2 | 0.05 |
| LFS_1 | 0.1 | 0.9 | 0.8 | 0.95 |

TABLE 17

Commit (COM) 838

| P(COM\|LFS) LFS | LFS_0 | LFS_1 |
|---|---|---|
| COM_0 | 0.9 | 0.1 |
| COM_1 | 0.1 | 0.9 |

TABLE 18

DB Events 808

| P(DB_Events\|COM, IO, CON, APP | | | | | | |
|---|---|---|---|---|---|---|
| COM | COM_0 | COM_0 | COM_0 | COM_0 | COM_0 | ... COM_1 |
| IO | IO_0 | IO_0 | IO_0 | IO_0 | IO_1 | ... IO_1 |
| CON | CON_0 | CON_0 | CON_1 | CON_1 | CON_0 | ... CON_1 |
| APP | APP_0 | APP_1 | APP_0 | APP_1 | APP_0 | ... APP_1 |
| DB_Events_0 | 0.95 | 0.2 | 0.2 | 0.1 | 0.2 | ... 0 |
| DB_Events_1 | 0.5 | 0.8 | 0.8 | 0.9 | 0.8 | ... 1 |

TABLE 19

DB Health (DBH) 810

| P(DBH\|DB_Events, SYS) DB_Events SYS | DB_Events_0 SYS_0 | DB_Events_0 SYS_1 | DB_Events_1 SYS_0 | DB_Events1 SYS_1 |
|---|---|---|---|---|
| DBH_0 | 0.9 | 0.2 | 0.1 | 0.05 |
| DBH_1 | 0.1 | 0.8 | 0.9 | 0.95 |

Figure 9:
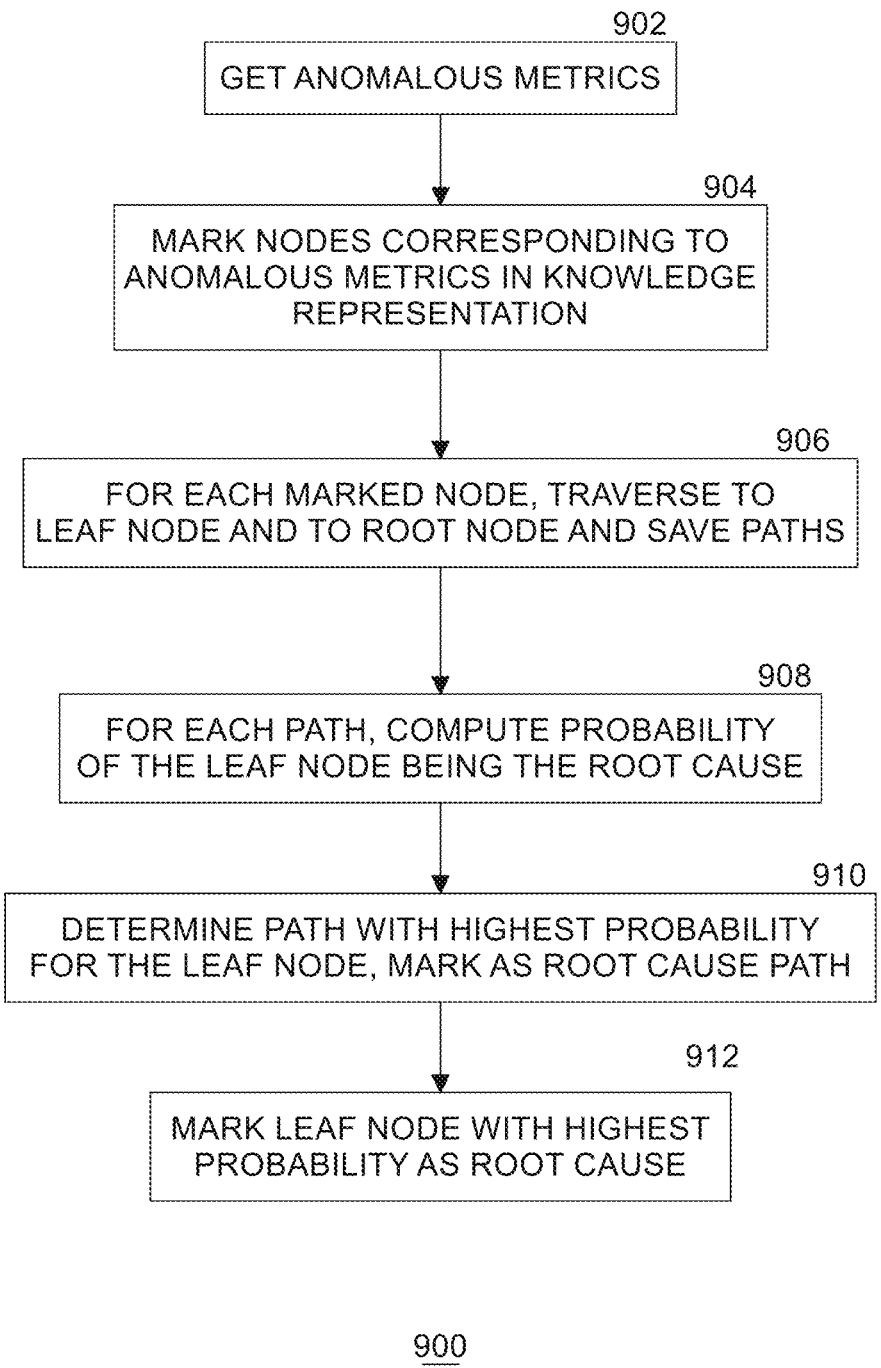
FIG. 9 is a flow diagram of causal inference engine processing according to some embodiments.

FIG. 9 is a flow diagram 900 of causal inference engine 410 processing according to some embodiments. At block 902, causal inference engine 410 gets anomalous metrics (as determined by anomaly detector 406 in FIGS. 6A and 6B) from metrics and anomalies 408. At block 904, causal inference engine 410 processes the anomalous metrics for the anomalous metrics data structure created at block 634 and marks nodes corresponding to anomalous metrics in knowledge representation 412 (e.g., a node such as app lock 802 of Bayesian network 800). In an embodiment, a node with an anomalous metric is marked as an "evidence node" in Bayesian network 800. At block 906, for each marked node (e.g., each evidence node), causal inference engine 410 traverses from the marked node to a leaf node (e.g., a possible root cause node) and from the marked node to a root (impact) node of Bayesian network 800. The combination of the two traversals is a potential root cause path. The potential root cause path is saved. At block 908, causal inference engine 410, for each potential root cause path, computes a probability of the leaf node for the potential root cause path being the root cause of the issue indicated by the anomalous metrics data. In an embodiment, the probability is computed using Bayes Theorem. At block 910, causal inference engine 410 determines the path that has the highest probability for the leaf node and marks the path as the root cause path. At block 912, the leaf node with the highest probability is marked as the root cause of the issue. The root cause is output as inference conclusions 414.

In one illustrative example, assume anomaly detector 406 detects anomalies for log file sync 836, log file parallel write 834, and DB sequential read 828 events of FIG. 8. Based on example Bayesian network 800 and the tables shown above, the probability of an I/O issue is 92.22% and the probability of a DB bug is 20.88%. Since the probability of an I/O issue is higher than the probability of a DB bug, causal inference engine 410 determines that the root cause of the issue is an I/O issue. This can be seen by a cause and effect chain of nodes I/O failure 824->storage latency 826->log file parallel write 834->log file sync 836->commit 838->DB events 808->DB health 810.

In another illustrative example, assume anomaly detector 406 detects anomalies for log file sync 836, however log file parallel write 834 and DB file sequential read 828 events are reported as normal. Based on example Bayesian network 800 and the tables shown above, the probability of an I/O issue is 19.32% and the probability of a DB bug is 66.67%. Since the probability of a DB bug is higher than the probability of an I/O issue, causal inference engine 410 determines that the root cause of the issue is a DB bug. This can be seen by a cause and effect chain of nodes DB bug 832->log file sync 836->commit 838->DB events 808->DB health 810.

Turning back to FIG. 4, inference conclusions 414 are input to self-healing engine 416, along with healing rules 418. Self-healing engine 416 takes specified pre-defined remedial actions in response to inference conclusions 414 (including one or more root causes as determined by causal inference engine 410) to fix one or more errors in database systems 16 and/or other software and/or hardware components of the computing system indicated by the anomalies. Examples of remedial actions include killing one or more database sessions which is causing application level locks, killing the database session using high temporary table space usages or other resources, restarting services which are hung up, and so on. Self-healing engine 416 gets the identified root cause and reads a self-healing action name and script from healing rules 418 for the identified root cause in inference conclusions 414. Self-healing engine 416 executes one or more healing actions 420 using the script to fix the issue identified by the root cause. In this way, self-healing engine 416 automatically resolves the issue when possible. If the issue cannot be automatically resolved, in an embodiment a case is created in a case management system (not shown) with details of anomalies detected and identified root cause. The case will then be handled using a manual approach by system administrators and/or systems engineers.

Finally, visualization and reporting 422 is executed to display and report the anomalies and/or root causes to system administrators and/or DB engineers. In an embodiment, the visualization and reporting are done using a web-based user interface. In an embodiment, the user interface comprises an analytic dashboard. In another embodiment, the visualization and reporting are done using reports (such as hypertext markup language (HTML) reports) attached to the case in the case management system for manual review of the issue.

Embodiments of the present invention provide at least several advantages. Because of the complexity involved, training and developing a model to capture all possible scenarios is laborious. In embodiments, the model doesn't need extensive training because the anomaly detection approach is used to detect abnormalities in the cloud computing environments having large numbers of databases. In embodiments, the model captures expert/engineer knowledge with accuracy and enables the system to make accurate predictions, performs impact analysis, and makes a self-healing decision. The combination of anomaly detection and use of a Bayesian network for the knowledge representation of experts/engineers ensures effectiveness in identifying and fixing errors. The accuracy in capturing an anomaly and performing causal inference with self-healing actions is high within this model because the cloud computing infrastructure component's metrics are heavily used to perform root cause analysis and make remediation decisions. Embodiments also help system administrators and/or systems engineers to detect new and complex unknown situations in the computing system which were not previously humanly possible to detect, thereby improving the resiliency of the cloud computing infrastructure. Metrics can be correlated on the fly and the expert knowledge representation helps to find multiple cause and effect relations given the confidence level and given the evidence.

Examples of systems, apparatuses, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B, or C" is intended to include the possibilities of "A," "B," "C," "A and B," "B and C," "A and C," and "A, B, and C."

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

In addition, the articles "a" and "an" as used herein and in the appended claims should generally be construed to mean "one or more" unless specified otherwise or clear from context to be directed to a singular form. Reference throughout this specification to "an implementation," "one implementation," "some implementations," or "certain implementations" indicates that a particular feature, structure, or characteristic described in connection with the implementation is included in at least one implementation. Thus, the appearances of the phrase "an implementation," "one implementation," "some implementations," or "certain implementations" in various locations throughout this specification are not necessarily all referring to the same implementation.

Some portions of the detailed description may be presented in terms of algorithms and symbolic representations of operations on data bits within a computer memory. These algorithmic descriptions and representations are the manner used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "retrieving," "transmitting," "computing," "generating," "adding," "subtracting," "multiplying," "dividing," "optimizing," "calibrating," "detecting," "performing," "analyzing," "determining," "enabling," "identifying," "modifying," "transforming," "applying," "aggregating," "extracting," "registering," "querying," "populating," "hydrating," "updating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission, or display devices.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which a computing environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM, and the like without departing from the scope of the implementations claimed. Moreover, the implementations are applicable to other systems and environments including, but not limited to, client-server models, mobile technology and devices, wearable devices, and on-demand services.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Any of the software components or functions described in this application can be implemented as software code to be executed by one or more processors using any suitable computer language such as, for example, C, C++, Java™ (a trademark of Sun Microsystems, Inc.), or Perl using, for example, existing or object-oriented techniques. The software code can be stored as non-transitory instructions on any type of tangible computer-readable storage medium (referred to herein as a "non-transitory computer-readable storage medium"). Examples of suitable media include random access memory (RAM), read-only memory (ROM), magnetic media such as a hard-drive or a floppy disk, or an optical medium such as a compact disc (CD) or digital versatile disc (DVD), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system and may be among other computer-readable media within a system or network. A computer system, or other computing device, may include a monitor, printer, or other suitable display for providing any of the results mentioned herein to a user.

The disclosure also relates to apparatuses, devices, and system adapted/configured to perform the operations herein. The apparatuses, devices, and systems may be specially constructed for their required purposes, may be selectively activated or reconfigured by a computer program, or some combination thereof.

In the foregoing description, numerous details are set forth. It will be apparent, however, to one of ordinary skill in the art having the benefit of this disclosure, that the present disclosure may be practiced without these specific details. While specific implementations have been described herein, it should be understood that they have been presented by way of example only, and not limitation. The breadth and scope of the present application should not be limited by any of the implementations described herein but should be defined only in accordance with the following and later-submitted claims and their equivalents. Indeed, other various implementations of and modifications to the present disclosure, in addition to those described herein, will be apparent to those of ordinary skill in the art from the foregoing description and accompanying drawings. Thus, such other implementations and modifications are intended to fall within the scope of the present disclosure.

Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. A system, comprising:
a metrics collector to collect metrics data from one or more databases of a computing system;
an anomaly detector, coupled to the metrics collector, to analyze the metrics data and detect one or more anomalies;
a causal inference engine, coupled to the anomaly detector, to mark one or more nodes in a knowledge representation corresponding to the metrics data for the one or more anomalies and to determine a root cause with a highest probability of causing the one or more anomalies using the knowledge representation; and
a self-healing engine, coupled to the causal inference engine, to take at least one remedial action for the one or more databases in response to determination of the root cause.

2. The system of claim 1, wherein the metrics data comprises at least one of database metrics and operating system metrics.

3. The system of claim 1, wherein the metrics data comprises at least one of log scanner metrics and change scanner metrics.

4. The system of claim 1, wherein the metrics collector is to store metrics data collected within a most recent selected period of time as recent metrics data in a memory of the computing system and metrics data collected earlier than the most recent selected period of time as historical metrics data in a long term storage device of the computing system.

5. The system of claim 4, wherein the anomaly detector is to compute a median value, a median absolute deviation, and a critical threshold for a metric of the historical metrics data.

6. The system of claim 5, wherein the anomaly detector is to compute an anomaly value called a Z score for a sample of a metric from the recent metrics data according to a formula:

$$zscore(of\ x_r) = (x_r - median(X_h)) \div (median(|X_{h(i)} - median(X_h)|_{i=1\ldots n}))$$

where $x_r$ is a metrics data sample value from the recent metrics data, $X_h$ are metrics data sample values from the historical metrics data, and $X_{h(i)\ where\ i=1\ldots n}$ are metrics data sample values in $X_h$.

7. The system of claim 6, wherein the anomaly detector is to mark the sample as anomalous when an absolute value of the Z score of the sample is greater than an absolute value of the critical threshold.

8. The system of claim 7, wherein the anomaly detector is to mark the metric as anomalous when a number of anomalous samples for the metric is greater than a predetermined threshold.

9. The system of claim 1, wherein the knowledge representation comprises a Bayesian network.

10. The system of claim 9, wherein the causal inference engine is to
mark nodes of the Bayesian network corresponding to metrics of the one or more anomalies;
for each marked node, traverse a path in the Bayesian network from the marked node to a leaf node and from the marked node to a root node;
for each path, compute a probability of the leaf node being the root cause;
determining a path with the highest probability for the leaf node and mark the path as a root cause path; and
marking the leaf node with the highest probability as the root cause.

11. A computer-implemented method comprising:
collecting metrics data from one or more databases of a computing system;
analyzing the metrics data and detecting one or more anomalies;
marking one or more nodes in a knowledge representation corresponding to the metrics data for the one or more anomalies and determining a root cause with a highest probability of causing the one or more anomalies using the knowledge representation; and
taking at least one remedial action for the one or more databases in response to determination of the root cause.

12. The computer-implemented method of claim 11, wherein the metrics data comprises at least one of database metrics and operating system metrics.

13. The computer-implemented method of claim 11, wherein the metrics data comprises at least one of log scanner metrics and change scanner metrics.

14. The computer-implemented method of claim 11, comprising storing metrics data collected within a most recent selected period of time as recent metrics data in a memory of the computing system and metrics data collected earlier than the most recent selected period of time as historical metrics data in a long term storage device of the computing system.

15. The computer-implemented method of claim 14, comprising computing a median value, a median absolute deviation, and a critical threshold for a metric of the historical metrics data.

16. The computer-implemented method of claim 15, comprising computing an anomaly value called a Z score for a sample of a metric from the recent metrics data according to a formula:

$$zscore(\text{of } x_r) = (x_r - \text{median}(X_h)) \div (\text{median}(|X_{h(i)} - \text{median}(X_h)|_{i=1\ldots n}))$$

where $x_r$ is a metrics data sample value from the recent metrics data, $X_h$ are metrics data sample values from the historical metrics data, and $X_{h(i) \text{ where } i=1\ldots n}$ are metrics data sample values in $X_h$.

17. The computer-implemented method of claim 16, comprising marking the sample as anomalous when an absolute value of the Z score of the sample is greater than an absolute value of the critical threshold.

18. The computer-implemented method of claim 17, comprising marking the metric as anomalous when a number of anomalous samples for the metric is greater than a predetermined threshold.

19. The computer-implemented method of claim 11, wherein the knowledge representation comprises a Bayesian network.

20. The computer-implemented method of claim 19, comprising:
marking nodes of the Bayesian network corresponding to metrics of the one or more anomalies;
for each marked node, traversing a path in the Bayesian network from the marked node to a leaf node and from the marked node to a root node;
for each path, computing a probability of the leaf node being the root cause;
determining a path with the highest probability for the leaf node and marking the path as a root cause path; and
marking the leaf node with the highest probability as the root cause.

21. A tangible, non-transitory computer-readable storage medium having instructions encoded thereon which, when executed by a processing device, cause the processing device to:
collect metrics data from one or more databases of a computing system;
analyze the metrics data and detecting one or more anomalies;
mark one or more nodes in a knowledge representation corresponding to the metrics data for the one or more anomalies and determine a root cause with a highest probability of causing the one or more anomalies using the knowledge representation; and
take at least one remedial action for the one or more databases in response to determination of the root cause.

22. The tangible, non-transitory computer-readable storage medium of claim 21, comprising instructions to store metrics data collected within a most recent selected period of time as recent metrics data in a memory of the computing system and metrics data collected earlier than the most recent selected period of time as historical metrics data in a long term storage device of the computing system.

23. The tangible, non-transitory computer-readable storage medium of claim 22, comprising instructions to compute a median value, a median absolute deviation, and a critical threshold for a metric of the historical metrics data.

24. The tangible, non-transitory computer-readable storage medium of claim 23, comprising instructions to compute an anomaly value called a Z score for a sample of a metric from the recent metrics data according to a formula:

$$zscore(\text{of } x_r) = (x_r - \text{median}(X_h)) \div (\text{median}(|X_{h(i)} - \text{median}(X_h)|_{i=1\ldots n}))$$

where $x_r$ is a metrics data sample value from the recent metrics data, $X_h$ are metrics data sample values from the historical metrics data, and $X_{h(i) \text{ where } i=1\ldots n}$ are metrics data sample values in $X_h$.

25. The tangible, non-transitory computer-readable storage of claim 24, comprising instructions to mark the sample as anomalous when an absolute value of the Z score of the sample is greater than an absolute value of the critical threshold.

26. The tangible, non-transitory computer-readable storage medium of claim 25, comprising instructions to mark the metric as anomalous when a number of anomalous samples for the metric is greater than a predetermined threshold.

27. The tangible, non-transitory computer-readable storage medium of claim 21, wherein the knowledge representation comprises a Bayesian network.

28. The tangible, non-transitory computer-readable storage medium of claim 27, comprising instructions to:
mark nodes of the Bayesian network corresponding to metrics of the one or more anomalies;
for each marked node, traverse a path in the Bayesian network from the marked node to a leaf node and from the marked node to a root node;
for each path, compute a probability of the leaf node being the root cause;
determine a path with the highest probability for the leaf node and mark the path as a root cause path; and
mark the leaf node with the highest probability as the root cause.

* * * * *